United States Patent
Krishnan et al.

(10) Patent No.: US 7,493,133 B2
(45) Date of Patent: Feb. 17, 2009

(54) POWER CONTROL IN AD-HOC WIRELESS NETWORKS

(75) Inventors: Ranganathan Krishnan, San Diego, CA (US); Amol Rajkotia, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 78 days.

(21) Appl. No.: 10/773,629

(22) Filed: Feb. 5, 2004

(65) Prior Publication Data

US 2005/0176455 A1  Aug. 11, 2005

(51) Int. Cl.
*H04B 7/00* (2006.01)
*H04Q 7/20* (2006.01)

(52) U.S. Cl. .................. 455/522; 455/69; 455/126; 455/67.11

(58) Field of Classification Search .......... 455/522, 455/69, 525, 67.13, 67.11–13, 70, 126, 63.1, 455/134, 135, 137, 501, 127.1, 115.1; 370/332, 370/320
See application file for complete search history.

(56) References Cited

U.S. PATENT DOCUMENTS

| | | | | |
|---|---|---|---|---|
| 5,697,073 A * | 12/1997 | Daniel et al. | ............... | 455/126 |
| 6,072,784 A | 6/2000 | Agrawal et al. | ............. | 370/311 |
| 6,118,767 A | 9/2000 | Shen et al. | .................. | 370/252 |
| 6,577,875 B1 | 6/2003 | Brouwer | ..................... | 455/522 |
| 6,647,273 B2 * | 11/2003 | Parssinen et al. | ............ | 455/522 |
| 6,697,634 B1 * | 2/2004 | Hayashi | ...................... | 455/522 |
| 6,778,839 B2 | 8/2004 | Valkealahti | ................. | 455/522 |
| 6,788,138 B2 * | 9/2004 | Suzuki | ....................... | 455/126 |
| 6,813,254 B1 | 11/2004 | Mujtaba | ..................... | 370/335 |
| 6,816,717 B1 | 11/2004 | Sipila | ....................... | 455/277.2 |
| 2002/0137535 A1 * | 9/2002 | Hunzinger | .................. | 455/522 |
| 2002/0196766 A1 * | 12/2002 | Hwang et al. | ............... | 370/342 |
| 2003/0166407 A1 * | 9/2003 | Qian et al. | ................... | 455/522 |
| 2004/0062216 A1 * | 4/2004 | Nicholls et al. | ............. | 370/320 |
| 2004/0203462 A1 * | 10/2004 | Lin et al. | .................. | 455/67.13 |
| 2006/0046767 A1 * | 3/2006 | Hunzinger | .................. | 455/522 |

* cited by examiner

*Primary Examiner*—John J Lee
(74) *Attorney, Agent, or Firm*—Mary Fales; Thomas R. Rouse

(57) ABSTRACT

Systems and techniques are disclosed relating to wireless communications. The systems and techniques involve wireless communications wherein a module or communications device is configured to enable a closed-loop power control in response to a detecting a wide-band interferer and disable the closed-loop power control in response to not detecting interferer.

20 Claims, 7 Drawing Sheets

POWER CONTROL IN AD-HOC WIRELESS NETWORKS

FIELD

The present disclosure relates generally to wireless communications, and more specifically, to various systems and techniques for power control in ad-hoc wireless networks.

BACKGROUND

In conventional wireless communications, an access network is generally employed to support communications for a number of mobile devices. An access network is typically implemented with multiple fixed site base stations dispersed throughout a geographic region. The geographic region is generally subdivided into smaller regions known as cells. Each base station may be configured to serve the mobile devices in its respective cell. An access network may not be easily reconfigured when there are varying traffic demands across different cellular regions.

In contrast to the conventional access network, ad-hoc networks are dynamic. An ad-hoc network may be formed when a number of wireless communication devices, often referred to as terminals join together to form a network. Terminals in ad-hoc networks can operate as either a host or router. Thus, an ad-hoc network may be easily reconfigured to meet existing traffic demands in a more efficient fashion. Moreover, ad-hoc networks do not require the infrastructure required by conventional access networks, making ad-hoc networks an attractive choice for the future.

Ultra-Wideband (UWB) is an example of a communications technology that may be implemented with ad-hoc networks. UWB provides high speed communications over a wide frequency bandwidth. At the same time, UWB signals are transmitted in very short pulses that consume very little power. The output power of the UWB signal is so low that it looks like noise to other RF technologies, making it less interfering.

Numerous multiple access techniques exist to support simultaneous communications in an ad-hoc network. A Frequency Division Multiple Access (FDMA) scheme, by way of example, is a very common technique. FDMA typically involves allocating distinct portions of the total bandwidth to individual communications between two terminals in the ad-hoc network. While this scheme may be effective for uninterrupted communications, better utilization of the total bandwidth may be achieved when such constant, uninterrupted communication is not required.

Other multiple access schemes include Time Division Multiple Access (TDMA). These TDMA schemes may be particularly effective in allocating limited bandwidth among a number of terminals which do not require uninterrupted communications. TDMA schemes typically dedicate the entire bandwidth to each communication channel between two terminals at designated time intervals.

Code Division Multiple Access (CDMA) techniques may be used in conjunction with TDMA to support multiple communications during each time interval. This may be achieved by transmitting each communication or signal in a designated time interval with a different code that modulates a carrier, and thereby, spreads the spectrum of the signal. The transmitted signals may be separated in the receiver terminal by a demodulator that uses a corresponding code to de-spread the desired signal. The undesired signals, whose codes do not match, are not de-spread in bandwidth and contribute only to noise.

In an ad-hoc network, terminals are added dynamically. As more terminals are added, each communicating terminal creates more interference for terminals other than the terminal with which it is communicating. Thus, it is desirable to control terminal transmit power to avoid adverse interference with other terminal communications.

SUMMARY

In one aspect of the present invention, a method of power control includes enabling closed-loop power control in response to detecting a wide-band interference above a threshold, disabling closed-loop power control in response to determining the wide-band interference is below a threshold, and sending a power feedback signal indicating a power transmission level if the closed-loop power control is enabled.

In another aspect of the present invention, a wireless terminal includes means for enabling closed-loop power control in response to detecting a wide-band interference above a threshold, means for disabling closed-loop power control in response to determining the wide-band interference is below a threshold, and means for sending a power feedback signal indicating a power transmission level if the closed-loop power control is enabled.

In yet another aspect of the present invention, a wireless terminal includes a receiver for detecting a wide-band interference above a threshold, a baseband processor for enabling closed-loop power control in response to detecting the wide-band interference, the baseband processor coupled to the receiver, and a transmitter for sending a power feedback signal indicating a power transmission level if the closed-loop power control is enabled, the transmitter coupled to the baseband processor.

In a further aspect of the present invention, computer readable media embodying a program of instructions executable by a computer program may be used to enabe closed-loop power control in response to detecting a wide-band interference above a threshold, disable closed-loop power control in response to determining the wide-band interference is below a threshold, and send a power feedback signal indicating a power transmission level if the closed-loop power control is enabled.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

The word "exemplary" is used exclusively herein to mean "serving as an example, instance, or illustration." Any embodiment described herein as "exemplary" is not necessarily to be construed as preferred or advantageous over other embodiments.

In the following detailed description, various aspects of the present invention may be described in the context of a UWB wireless communications system. While these inventive aspects may be well suited for use with this application, those skilled in the art will readily appreciate that these inventive aspects are likewise applicable for use in various other communication environments. Accordingly, any reference to a UWB communications system is intended only to illustrate the inventive aspects, with the understanding that such inventive aspects have a wide range of applications.

Figure 1:
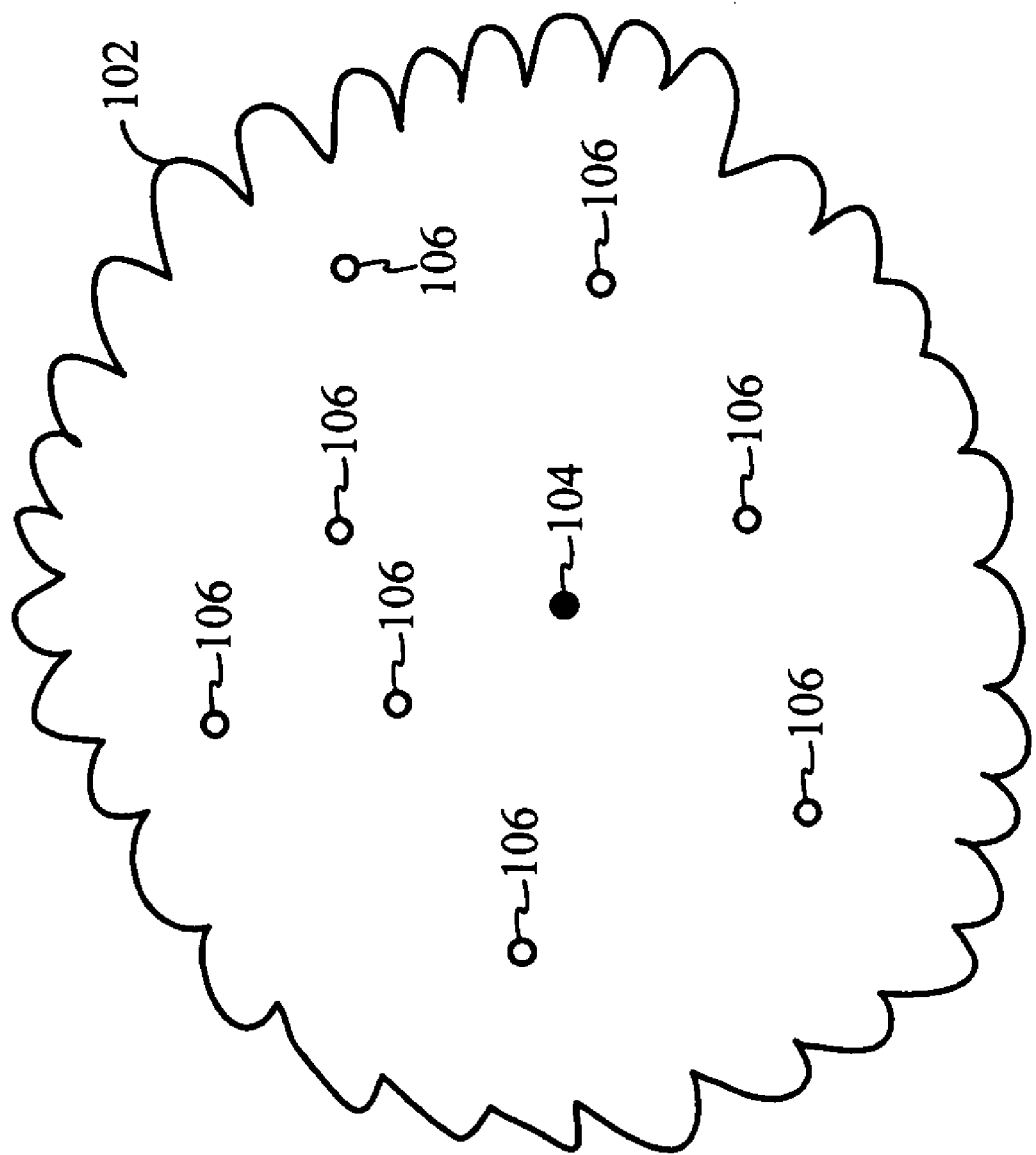
FIG. 1 is a conceptual diagram illustrating an example of a piconet.

FIG. 1 illustrates an example of a network topology for a piconet in a wireless communications system. A "piconet" is a collection of communication devices or terminals connected using wireless technology in an ad-hoc fashion. The terminals may be stationary or in motion, such as a terminal that is being carried by a user on foot or in a vehicle, aircraft or ship. The term "terminal" is intended to encompass various types of communications devices including cellular, PCS, wireless or landline phones, personal data assistants (PDA), laptops, external or internal modems, PC cards, and other similar devices.

In at least one embodiment of the wireless communications system, each piconet has one master terminal and a number of member terminals slaved to the master terminal. In FIG. 1, a piconet 102 is shown with a master terminal 104 supporting communications between several member terminals 106. The master terminal 104 may be able to communicate with each of the member terminals 106 in the piconet. The member terminals 106 may also be able to directly communicate with one another under control of the master terminal 104. As to be explained in greater detail below, each member terminal 106 in the piconet 102 may also be able to directly communicate with terminals outside the piconet.

The master terminal 104 may communicate with the member terminals 106 using any multiple access scheme, such as TDMA, FDMA, CDMA, or any other multiple access scheme. To illustrate the various aspects of the present invention, the wireless communications system shown in FIG. 1 will be described in the context of a hybrid multiple access scheme employing both TDMA and CDMA technologies. Those skilled in the art will readily understand that the present invention is in no way limited to such multiple access schemes.

A piconet may be formed in a variety of ways. By way of example, when a terminal initially powers up, it may search for pilot signals from piconet master terminals. The pilot signal broadcast by each piconet master terminal may be an unmodulated spread-spectrum signal, or some other reference signal. In spread-spectrum configurations, a psuedo-random noise (PN) code unique to each piconet master terminal may be used to spread the pilot signal. Using a correlation process, the terminal may search through possible PN codes to identify the master terminal with the strongest pilot signal. If the strongest pilot signal is received with sufficient signal strength to support a minimum data rate, then the terminal may attempt to join the piconet by registering with the master terminal.

A terminal may be unable to find a pilot signal because there is no master terminal. In some instances, a terminal may be unable to find a pilot signal of sufficient signal strength to support the minimum data rate. This may result from any number of reasons. By way of example, the terminal may be too far from the master terminal. Alternatively, the propagation environment may be insufficient to support the requisite data rate. In either case, the terminal may be unable to join an existing piconet, and therefore, may begin operating as an isolated terminal by transmitting its own pilot signal. The isolated terminal may become the master terminal for a new piconet. Other terminals that are able to receive the pilot signal broadcast from the isolated terminal with sufficient strength may attempt to acquire that pilot signal and join the piconet of this isolated terminal.

The master terminal 104 may use a periodic frame structure to coordinate intra-piconet communications. This frame is often referred to in the art as a Medium Access Control (MAC) frame because it is used to provide access to the communications medium for various terminals. It would be apparent to those skilled in the art that a frame may be any duration depending on the particular application and overall design constraints.

For the purpose of discussion, a frame duration of approximately 5 ms will be used. An approximate 5 ms frame is reasonable to accommodate a high chip rate of approximately 650 Mcps and a desire to support data rates down to approximately 19.2 kbps.

Figure 2:
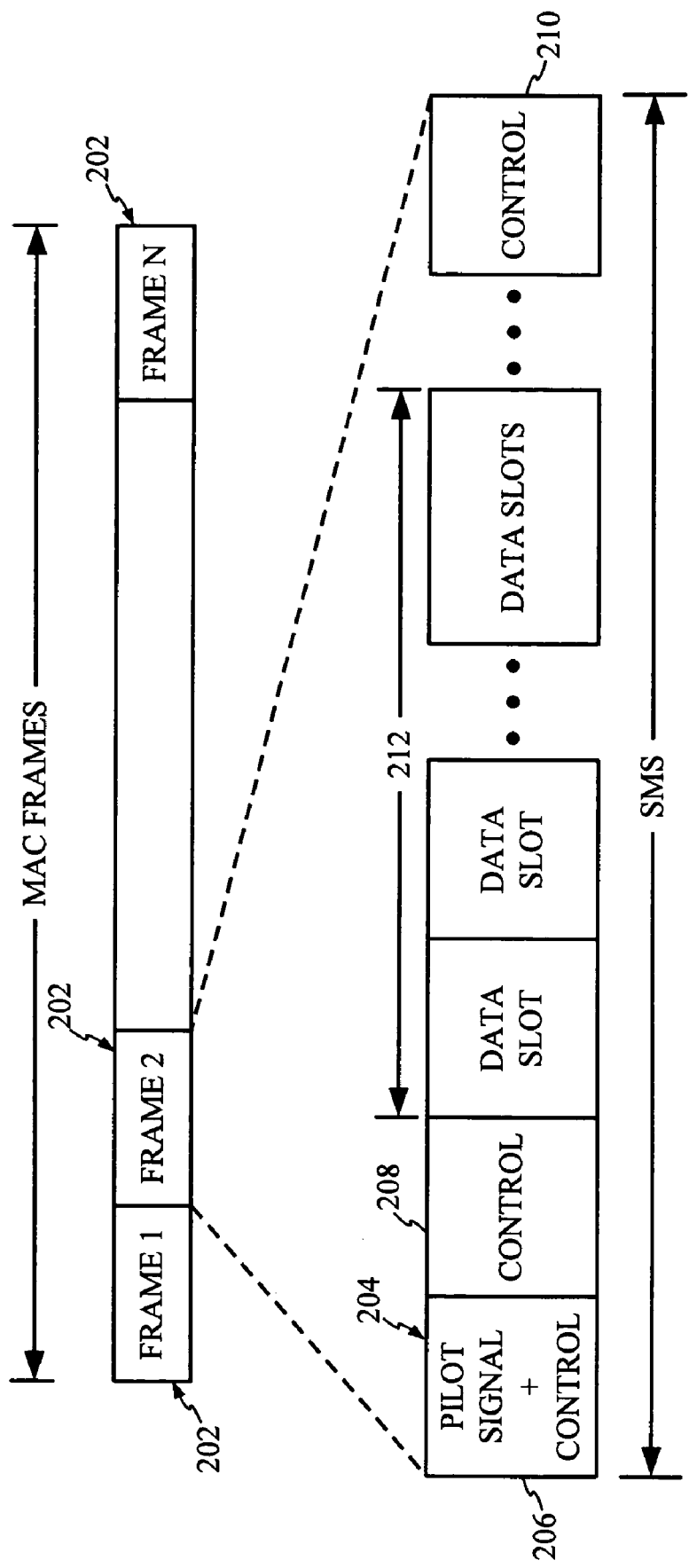
FIG. 2 is a conceptual diagram illustrating an example of a Medium Access Control (MAC) frame for controlling intra-piconet communications.

An example of a MAC frame structure is shown in FIG. 2 with n number of frames 202. Each frame may be divided into 160 or any other number of time slots 204. The slot duration may be approximately 31.25 μs, which corresponds to approximately 20,312.5 chips at approximately 650 Mcps. The frame may dedicate some of its slots for overhead. By way of example, the first slot 206 in the frame 202 may be used to broadcast the spread-spectrum pilot signal to the member terminals. The pilot signal may occupy the entire slot 206, or alternatively, be time shared with a control channel. The control channel occupying the end of the first slot 206 may be a spread-spectrum signal broadcast to all the member terminals at the same power level as the pilot signal. The master terminal may use this control channel to define the composition of the MAC frame.

The master terminal may be responsible for scheduling intra-piconet communications. This may be accomplished through the use of one or more additional spread-spectrum control channels which occupy various time slots within the frame, such as time slots 208 and 210 in FIG. 2. These additional control channels may be broadcast by the master terminal to all the member terminals and include various scheduling information. The scheduling information may include time slot assignments for communications between terminals within the piconet. As shown in FIG. 2, these time slots may be selected from the data slots portion 212 of the frame 202. Additional information, such as the power level and data rate for each communication between terminals, may also be included. The master terminal may also grant transmit opportunities in any given time slot to any number of terminal pairs using a CDMA scheme. In this case, the scheduling information may also assign the spreading codes to be used for the individual communications between terminals.

The master terminal may periodically set aside a fraction of time for peer-to-peer transmissions. During this time, the master terminal 104 may assign one of the member terminals 106 to communicate with one or more isolated terminals and/or adjacent piconets. These transmissions may require high transmit power, and in some instances, can only be sustained at low data rates. In the event that high power transmissions are needed to communicate with the isolated terminals and/or adjacent piconets, the master terminal may decide not to schedule any intra-piconet communications at the same time.

Figure 3:
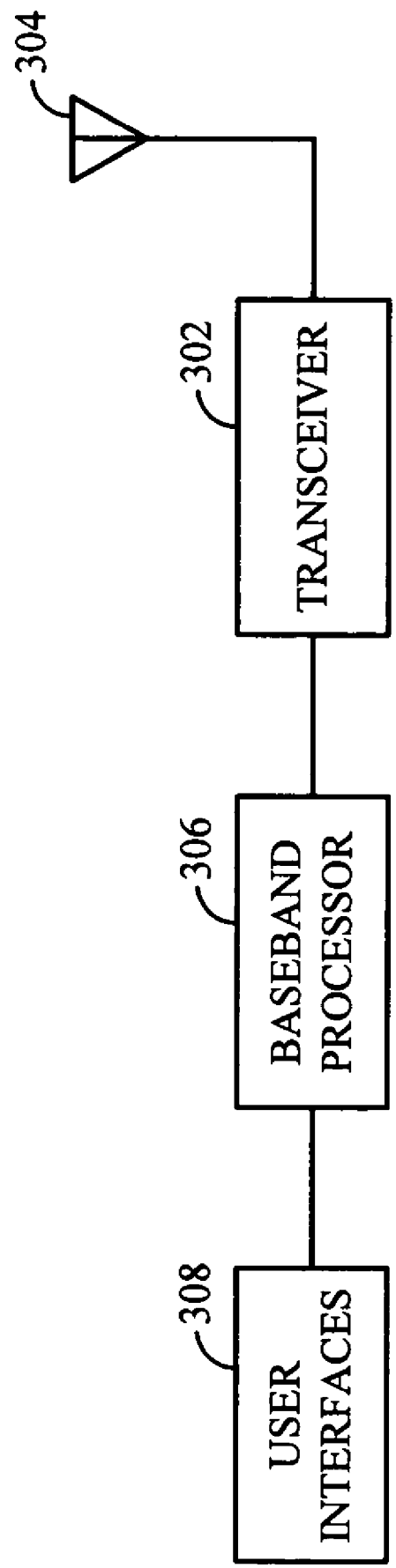
FIG. 3 is a functional block diagram illustrating an example of a terminal capable of operating within a piconet.

FIG. 3 is a conceptual block diagram illustrating one possible configuration of a terminal. As those skilled in the art will appreciate, the precise configuration of the terminal may vary depending on the specific application and the overall design constraints.

The terminal may be implemented with a front end transceiver 302 coupled to an antenna 304. A baseband processor 306 may be coupled to the transceiver 302. The baseband processor 306 may be implemented with a software based architecture, or any other type of architecture. A microprocessor may be used as a platform to run software programs that, among other things, provide executive control and overall system management functions that allow the terminal to operate either as a master or member terminal in a piconet. A digital signal processor (DSP) may be implemented with an embedded communications software layer which runs application specific algorithms to reduce the processing demands on the microprocessor. The DSP may be used to provide various signal processing functions such as pilot signal acquisition, time synchronization, frequency tracking, spread-spectrum processing, modulation and demodulation functions, and forward error correction.

The terminal may also include various user interfaces 308 coupled to the baseband processor 306. The user interfaces may include a keypad, mouse, touch screen, display, ringer, vibrator, audio speaker, microphone, camera and/or other input/output devices.

Figure 4:
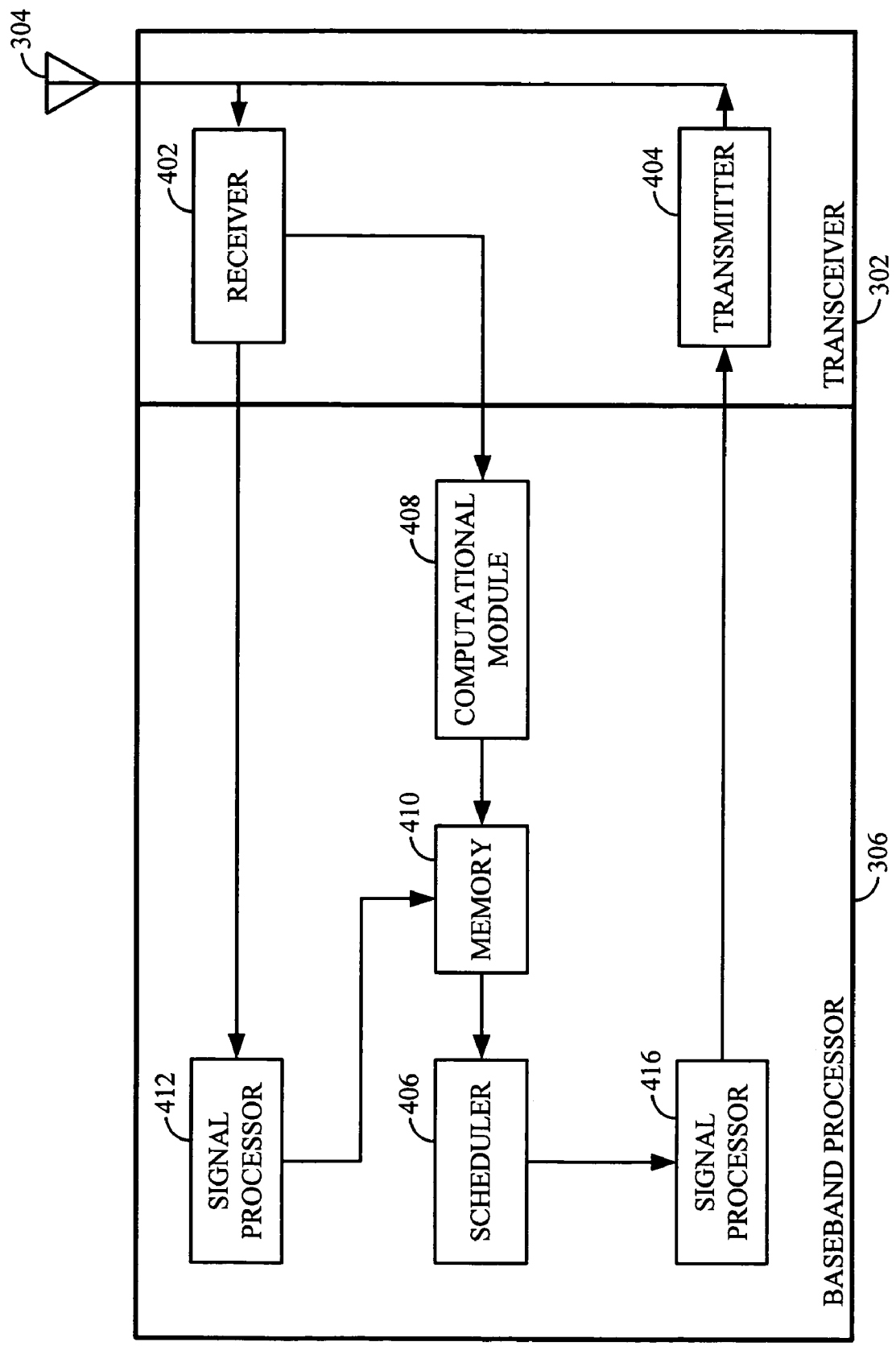
FIG. 4 is a conceptual block diagram illustrating an example of a terminal operating as a master terminal of a piconet.

FIG. 4 is a conceptual block diagram illustrating an example of a terminal operating as a master terminal. The baseband processor 306 is shown with the transceiver 302. The transceiver 302 may include a receiver 402. The receiver 402 provides detection of desired signals in the presence of noise and interference. The receiver 402 may be used to extract the desired signals and amplify them to a level where information contained in the received signal can be processed by the baseband processor 306.

The transceiver 302 may also include a transmitter 404. The transmitter 404 may be used to modulate information from the baseband processor 306 onto a carrier frequency. The modulated carrier may be upconverted to an RF frequency and amplified to a sufficient power level for radiation into free space through the antenna 304.

The baseband processor 306 may enable a scheduler 406 when operating as a master terminal. In the software based implementation of the baseband processor 306, the scheduler 406 may be a software program running on a microprocessor. However, as those skilled in the art will readily appreciate, the scheduler 406 is not limited to this embodiment, and may be implemented by any means known in the art, including any hardware configuration, software configuration, or combination thereof, which is capable of performing the various functions described herein.

The scheduler 406 may be used to schedule intra-piconet communications in a way that optimizes the capacity of the piconet. This may be achieved in a variety of ways. By way of example, the scheduler 406 may be used to carefully select the terminal pairs that will engage in simultaneous communications. A transmission power level may be scheduled for each of the simultaneous communications that satisfies a target quality parameter for each of the receiving terminals. The target quality parameter may be a desired carrier-to-interference (C/I) ratio at the receiving terminal, or any other quality parameter known in the art.

Figure 5:
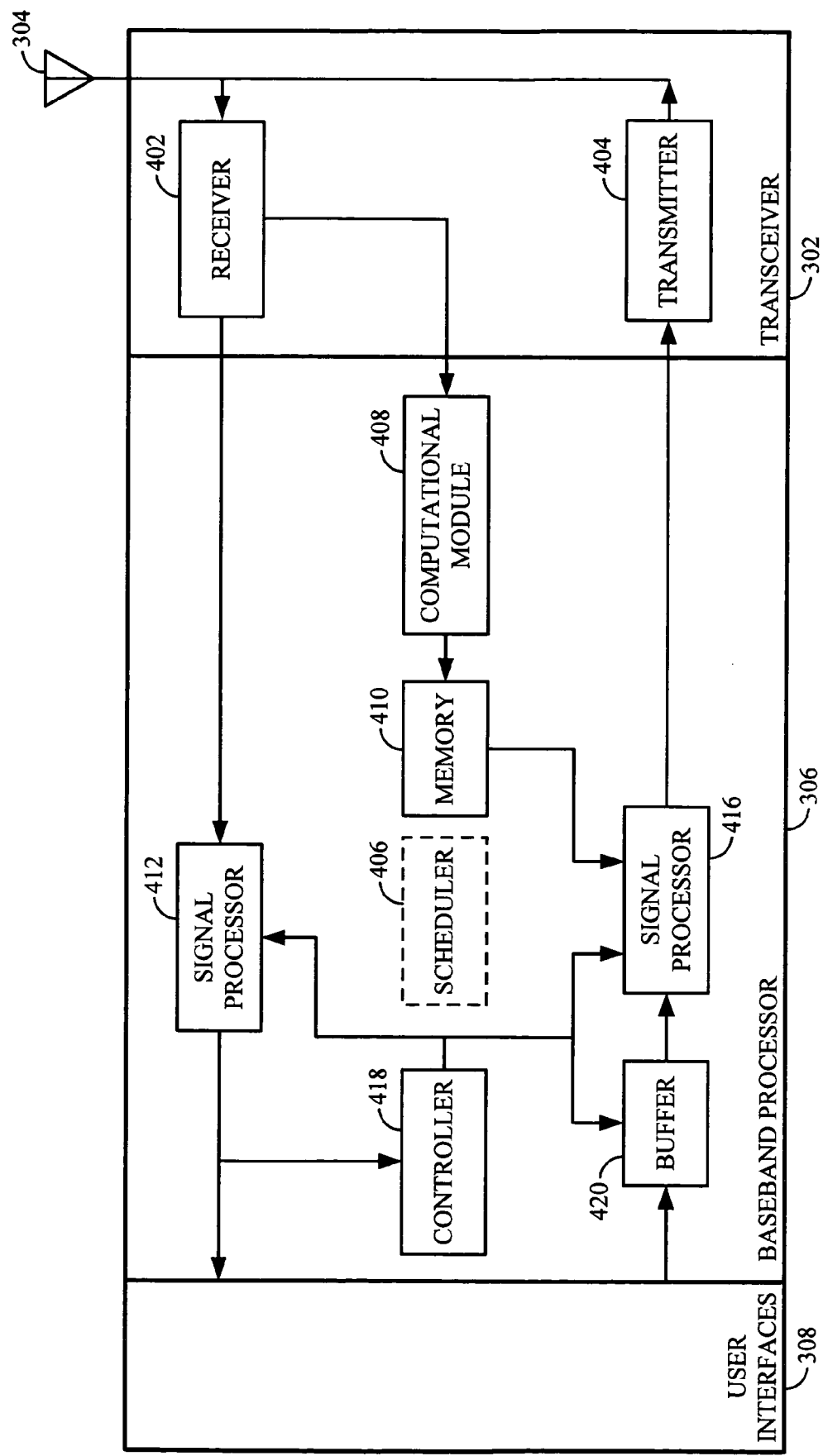
FIG. 5 is a conceptual block diagram illustrating an example of a terminal operating as a member terminal of the piconet.

FIG. 5 is a conceptual block diagram illustrating an example of a terminal operating as a member terminal. The scheduler 406 is shown with phantom lines illustrating that it is not enabled by the baseband processor 306 during operation as a member terminal. The configuration of the transceiver 302 is the same whether the baseband processor 306 is operating as a master or member terminal, and therefore, will not be discussed further. The transceiver 302 is shown in FIG. 5 for completeness.

As discussed earlier in connection with the baseband processor 306 configured as a master terminal, the scheduling assignments may be broadcast to all the member terminals in the piconet on one or more control channels. The signal processor 412 on the receiving end may employ spread-spectrum processing to extract the scheduling information from the control channel and provide it to a controller 418. The scheduling information may include the time slot assignments for the various transmissions to and from the member terminal, as well as the power level and data rate for each.

The controller 418 may be used to provide data rate and spreading information to the signal processor 412 on the receiving end for the scheduled transmissions to the member terminal. Using this information, the signal processor 412 may recover communications from other member terminals at the appropriate times and provide the recovered communications to the various user interfaces 308.

The controller 418 may also provide power level information to the computational module 408 for each transmission from another terminal (not shown). The computational module 408 may use this information to compute a path loss from the transmitting terminal by using the signal strength measurement from the transceiver 302 during scheduled transmissions. The path loss information computed by the computational module 408 may be stored in memory 410 and provided to the signal processor 416 on the transmitting end during the scheduled time for the control channel broadcast. In various embodiments of the terminal employing a GPS receiver (not shown), it may be used to provide coordinate information to the master terminal over a control channel broadcast via the signal processor 416 and the transceiver 302.

The signal processor 416 may be used to spread communications to various member terminals within the piconet. The communications may be originated from the various user interfaces 308 and stored in a buffer 420 until the scheduled transmission. At the scheduled time, the controller 418 may be used to release the communications from the buffer 420 to the signal processor 416 for spread-spectrum processing. The data rate, spreading code and transmission power level of the communications may be programmed into the signal processor 416 by the controller 418. Alternatively, the transmission power level may be programmed by the controller 418 at the transmitter 404 in the transceiver 302.

Figure 6:
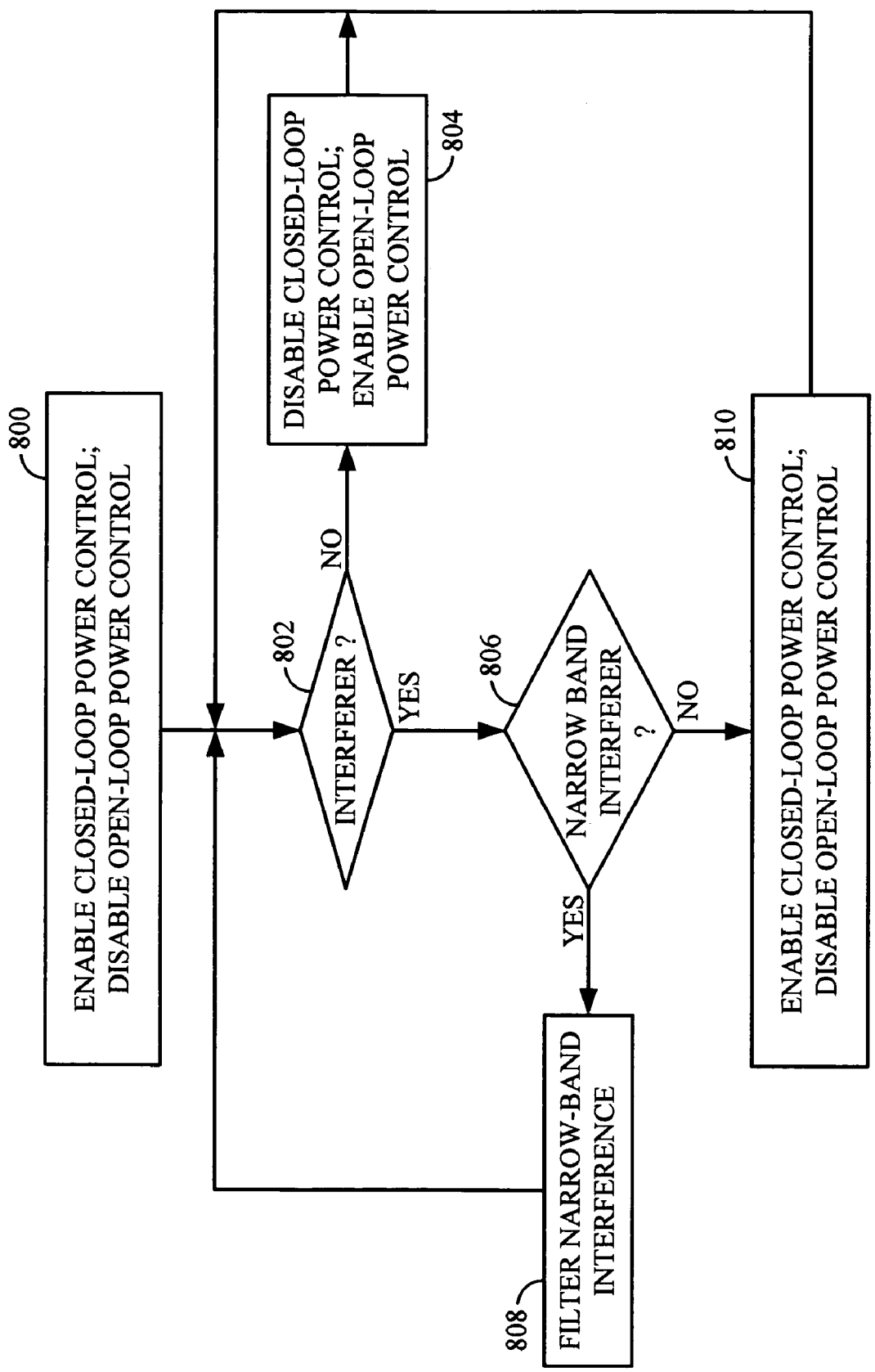
FIG. 6 is a flow diagram illustrating an example of power control operation when communications between two member terminals is established.

FIG. 6 is a flow diagram illustrating an example of power control operation when communications between two member terminals is established. In an embodiment, communication between a terminal A and a terminal B is bidirectional. When terminal A sends signals other than a feedback signal to terminal B, terminal A is the transmitting terminal and terminal B is the receiving terminal. When terminal B sends signals other than a feedback signal to terminal A, terminal B is the transmitting terminal and terminal A is the receiving terminal.

The receiving terminal performs the power control operation of FIG. 6. In an embodiment, the power control operation of FIG. 6 is performed periodically. In an embodiment, the power control operation is performed every time slot. In another embodiment, the power control operation is performed every frame. It would be apparent to those skilled in the art that the time period between successive executions of the power control operation of FIG. 6 depends on the wireless application. It would also be apparent to those skilled in the art that the time period between successive executions of the power control operation of FIG. 6 can be programmable.

Figure 7:
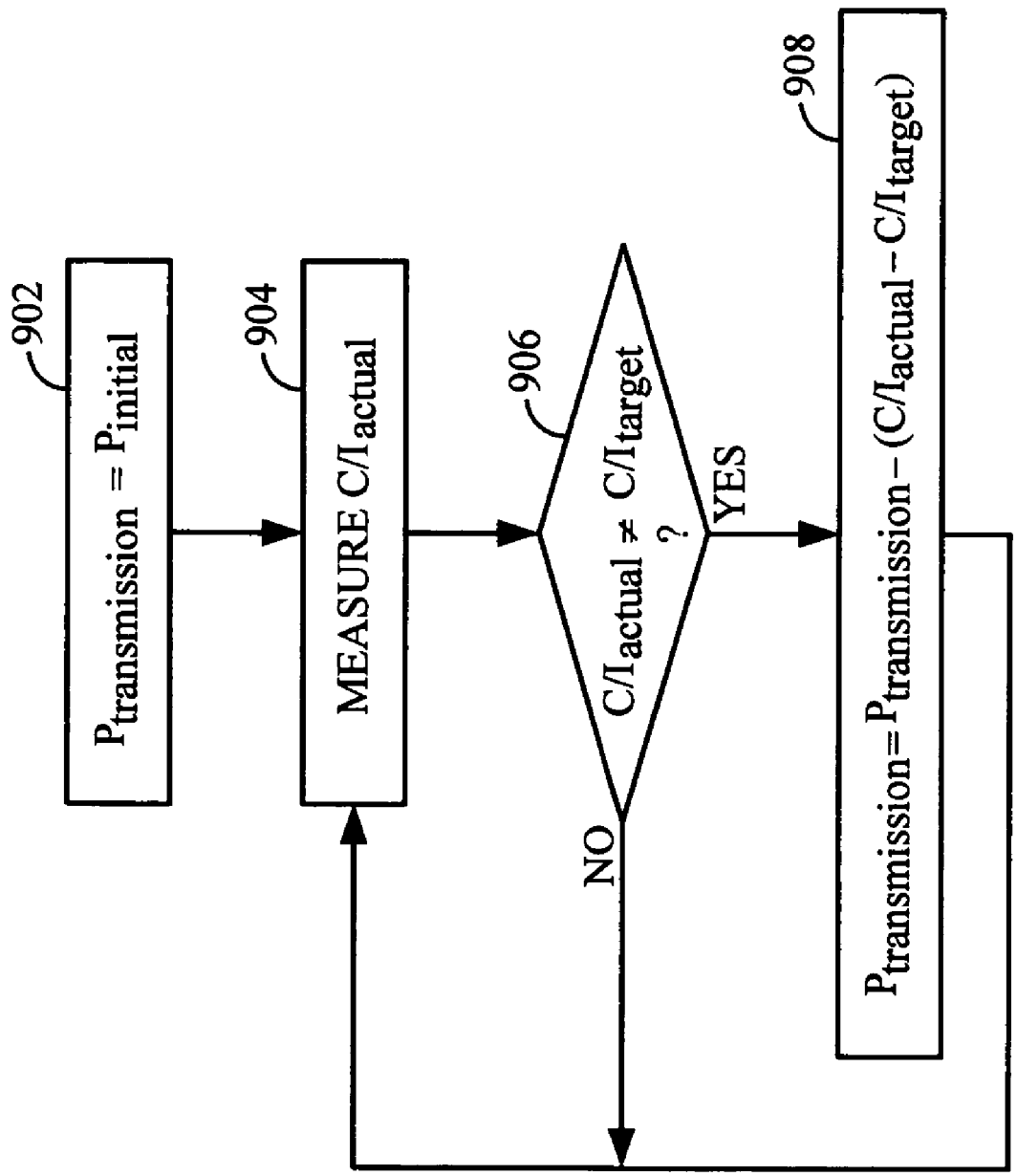
FIG. 7 is a flow diagram illustrating an example of open-loop power control operation when communications between two member terminals is established.

In step 800, closed-loop power control is enabled and open-loop power control is disabled. Closed-loop power control involves a feedback signal being sent by the receiving terminal to the transmitting terminal to provide the transmitting terminal feedback regarding the power of signals received at the receiving terminal. Open-loop power control involves setting transmission power as shown in FIG. 7 and described herein below. In an embodiment, the receiving terminal sends a feedback signal indicating the status of closed-loop power control, such as an enable/disable bit. In an embodiment, the receiving terminal sends a feedback signal indicating the status of open-loop power control such as enable/disable bit.

In step 802, the receiving terminal determines whether there is an interferer. If an interferer is not detected, then in step 804, closed loop power control is disabled and open-loop power control is enabled. Then, the flow of control loops back to step 802 for a next time period. If an interferer is detected, then in step 806, the receiving terminal determines whether the interferer is a narrow-band interferer or a wide-band interferer. A narrow-band interferer is a source that emits a signal within a bandwidth narrow enough to be substantially filtered below a threshold. A wide-band interferer is a source that emits a signal that is not within a bandwidth narrow enough to be substantially filtered below a threshold.

If the interferer is a narrow-band interferer, then in step 808, the narrow-band interference from the narrow-band interferer is filtered out by a notch filter. After the narrow-band interference is filtered out, then the flow of control goes to step 802 and the receiving terminal determines whether there is another interferer. If in step 806, the receiving terminal determines there is no narrow-band interferer, then in step 810, closed-loop power control between the receiving terminal and the transmitting terminal is enabled and open-loop power control is disabled. Then, the flow of control goes to step 802 for a next time period.

In an embodiment, the receiving terminal receives radio frequency (RF) signals via antenna 304. Receiver 402 amplifies and frequency downconverts the received RF signals to intermediate frequency (IF) signals, and filters the IF signals. The IF signals are output to signal processor 412 for digital processing.

In an embodiment, receiver 402 also includes circuitry for performing an analog measurement of total received signal power from the transmitting terminal. This power measurement is used to generate a feedback signal that is provided to transmitter 404. In an embodiment, a feedback signal is generated by a feedback generator included in the controller 418. In another embodiment, a feedback signal is generated by a feedback generator included in the computational module 408. It would be apparent to those skilled in the art that a feedback signal may be generated by any terminal module coupled to the receiver 402 and coupled to the transmitter 404 such that the terminal module receives the analog measurement and provides a feedback signal to the transmitter 404.

A feedback signal is sent by the receiving terminal to the transmitting terminal to provide the transmitting terminal feedback regarding the receipt of signals received at the receiving terminal. In an embodiment, an exemplary feedback signal indicates a transmission power level (hereinafter power feedback signal). The power feedback signal is a request by the receiving terminal that the transmitting terminal transmit at a transmission power level indicated by the power feedback signal. In an embodiment, the power feedback signal is transmission power level. In another embodiment, the power feedback signal is a change in the transmission power level. It would be apparent to those skilled in the art that the transmitting terminal can determine the requested transmission power level regardless whether it receives a transmission power level value or a change in transmission power level.

In an embodiment, the power feedback signal is a power adjustment command signal comprising a power-up or power-down command from the receiving terminal to the transmitting terminal. The transmitting terminal's transceiver 302 starts with a gain control level set to a nominal value. Each power-up command increases the value of a gain control command corresponding to a dB gain increase in amplifier gain. It would be apparent to those skilled in the art that the amount of gain corresponding to a power-up command can be programmable. Each power-down command decreases the value of the gain control command, corresponding to a dB decrease in amplifier gain. It would be apparent to those skilled in the art that the amount of gain corresponding to a power-down command can also be programmable.

In an embodiment, the analog measurement of the combined power of signals received from the transmitting terminal is used to determine a quality parameter. In an embodiment, the quality parameter is a Carrier-to-Interference (C/I) ratio at the receiving terminal. The quality parameter is compared to the target quality parameter. In an embodiment, the target quality parameter is a desired C/I ratio for a desired data rate.

In response to a quality parameter less than the target feedback parameter, the feedback generator generates a power-up command. In response to a quality parameter higher than the target feedback parameter, the feedback generator generates a power-down command. In an embodiment, if the quality parameter is equal to the target feedback parameter, the feedback generator generates a power-up command. Alternatively, the feedback generator may not issue a power feedback signal or may issue a power feedback signal indicating no change in power transmission level.

In an embodiment, a power command is generated after a varible n (n: integer) successive periods of the same power control status. For example, a power-up command may be issued after three successive periods wherein a quality parameter is less than the target feedback parameter.

In an embodiment, in addition to sending a power feedback signal to the transmitting terminal, the receiving terminal also sends a feedback signal indicating narrow-band interference.

It would be apparent to those skilled in the art that the feedback signals may be sent at various rates depending on the application.

FIG. 7 is a flow diagram illustrating an example of open-loop power control operation when communications between two member terminals is established. In step step 902, transmission power $P_{transmission}$ of the transmitting terminal is set to an initial transmission power $P_{initial}$. The initial transmission power is determined based on a target C/I. The flow of control proceeds to step 904. In step 904, a C/I ratio is measured at the receiver of the transmitting terminal ($C/I_{actual}$). The flow of control proceeds to step 906. In step 906, a test is made to determine whether the measured C/I is not equal to the target C/I. If the measured C/I is equal to the target C/I, then the flow of control goes to step 904. If the measured C/I is not equal to the target C/I, the flow of control goes to step 908. In step 908, the transmission power is set to the transmission power of the prior iteration less the difference between the measured C/I and the target C/I as shown in equation (1) below.

$$P_{transmission}=P_{transmission}-(C/I_{actual}-C/I_{target}) \qquad (1)$$

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of power control, comprising:
   determining whether a wide-band interference is above or below a threshold;
   sending a feedback signal, enabling closed-loop power control in response to determining the wide-band interference above the threshold;
   disabling the closed-loop power control and filtering narrowband interference in response to determining the wide-band interference is below the threshold; and
   sending a power feedback signal indicating a power transmission level when the closed-loop power control is enabled.

2. The method of claim 1 further comprising:
   disabling open-loop power control in response to determining the wide-band interference above the threshold; and
   enabling the open-loop power control in response to determining the wide-band interference is below the threshold.

3. The method of claim 1, wherein the power feedback signal is a power-up command indicating an increase in power transmission level.

4. The method of claim 3, wherein the power feedback signal is a power-up command when a quality parameter is less than a target quality parameter.

5. The method of claim 1, wherein the power feedback signal is a power-down command indicating a decrease in power transmission level.

6. The method of claim 5, wherein the power feedback signal is a power-down command when a quality parameter is greater than a target quality parameter.

7. A wireless terminal, comprising:
   means for enabling a feedback signal for closed-loop power control in response to determining a wide-band interference above a threshold;
   means for disabling the closed-loop power control and enabling narrow-band interference filtering in response to determining the wide-band interference is below the threshold; and
   means for sending a power feedback signal indicating a power transmission level when the closed-loop power control is established.

8. The wireless terminal of claim 7 further comprising:
   means for disabling open-loop power control in response to determining the wide-band interference above the threshold; and
   means for enabling open-loop power control in response to determining the wide-band interference is below the threshold.

9. The wireless terminal of claim 7, wherein the power feedback signal is a power-up command when a quality parameter is less than a target quality parameter.

10. The wireless terminal of claim 7, wherein the power feedback signal is a power-down command when a quality parameter is greater than a target quality parameter.

11. A wireless terminal, comprising:
    a receiver configured to determine a wide-band interference above a threshold and to filter narrow-band interference in response to determining the wide-band interference below the threshold;

a baseband processor configured to enable closed-loop power control in response to receiving a feedback signal detecting the wide-band interference, the baseband processor coupled to the receiver;

a transmitter configured to send a power feedback signal indicating a power transmission level when the closed-loop power control is enabled, the transmitter coupled to the baseband processor.

12. The wireless terminal of claim 11 wherein:

the baseband processor is configured to disable open-loop power control in response to detecting the wide-band interference above the threshold; and the baseband processor is configured to enable the open-loop power control in response to determining the wide-band interference is below the threshold.

13. The wireless terminal of claim 11, wherein the power feedback signal is a power-up command when a quality parameter is less than a target quality parameter.

14. The wireless terminal of claim 11, wherein the power feedback signal is a power-down command when a quality parameter is greater than a target quality parameter.

15. Computer readable medium embodying a program of instructions executable by a computer program for enabling a method of closed-loop power control, said instructions comprising:

a computer readable program code means for enabling the closed-loop power control in response to receiving a feedback signal determining a wide-band interference above a threshold;

a computer readable program code means for disabling the closed-loop power control and filtering narrow-band interference in response to determining the wide-band interference is below the threshold; and a computer readable program code means for sending a power feedback signal indicating a power transmission level when the closed-loop power control is established.

16. The instructions of claim 15 further comprising:

a computer readable program code means for disabling open-loop power control in response to determining the wide-band interference above the threshold; and a computer readable program code means for enabling the open-loop power control in response to determining the wide-band interference is below the threshold.

17. The instructions of claim 15, wherein the power feedback signal is a power-up command when a quality parameter is less than a target quality parameter.

18. The instructions of claim 15, wherein the power feedback signal is a power-down command when a quality parameter is greater than a target quality parameter.

19. A method of power control, comprising:

detecting an interferer;

determining whether the interferer is a narrow-band interferer or a wide-band interferer, when the interferer is detected;

enabling close-loop power control when the wide-band interferer is determined; and, disabling the close-loop control and filtering when the narrow-band interferer is determined.

20. The method of claim 19, further comprising:

disabling the close-loop power control and enabling open-loop power control, when the interferer is not detected.

* * * * *